United States Patent [19]
Rehnman

[11] 3,976,930
[45] Aug. 24, 1976

[54] CONTROLLED STATIC CONVERTOR FOR MOTOR CONTROL AND CONTROL ANGLE LIMITING ARRANGEMENT

[75] Inventor: Kjell Rehnman, Vasteras, Sweden

[73] Assignee: Allmanna Svenska Elektriska Aktiebolaget, Vasteras, Sweden

[22] Filed: Mar. 27, 1975

[21] Appl. No.: 562,485

[30] Foreign Application Priority Data
Apr. 5, 1974 Sweden .............................. 7404601

[52] U.S. Cl. ....................................... 321/5; 321/40
[51] Int. Cl.² ........................................... H02M 1/06
[58] Field of Search ............ 321/5, 40, 47; 318/213, 318/215, 230, 231

[56] References Cited
UNITED STATES PATENTS

| | | |
|---|---|---|
| 3,466,525 | 9/1969 | Ainsworth ....................... 321/47 X |
| 3,536,985 | 10/1970 | Ekstrom .......................... 321/40 X |
| 3,849,718 | 11/1974 | Forster et al. ........................ 321/40 |
| 3,863,134 | 1/1975 | Pollard ..................................... 321/5 |

*Primary Examiner*—Gerald Goldberg

[57] ABSTRACT

A controlled static convertor has terminals for connection to an alternating current source and includes controlled rectifiers and a control pulse device for delivering control signals to the rectifiers. The control pulse device includes arrangements for affecting the control angle ($\alpha$) of the rectifiers and for limiting the control angle to an upper limit value. Devices are provided to render the control angle limiting arrangement inactive when the direct current of the convertor is discontinuous. The direct current of the convertor is sensed and, if this current at a time corresponding to the upper limit value of the control angle is less than a predetermined limit value, renders the control angle limiting arrangement inactive.

2 Claims, 4 Drawing Figures

CONTROLLED STATIC CONVERTER FOR MOTOR CONTROL AND CONTROL ANGLE LIMITING ARRANGEMENT

BACKGROUND OF THE INVENTION

1. Field of the Invention

The present invention relates to a controlled static convertor having terminals for connection to an alternating voltage source and comprising controlled rectifiers and a control pulse device arranged to deliver control signals to the rectifiers, the control pulse device comprising means for affecting the control angle of the rectifiers and means for limiting the control angle to an upper limit value.

2. The Prior Art

A single-phase controlled static convertor is known which has four thyristors which receive ignition pulses from a control pulse device. The AC terminals of the convertor are connected to an alternating voltage source with a voltage $U_{AC}$. The DC side of the convertor is connected to a load object, such as a DC motor. The direct voltage of the convertor is controlled by phase-angle control, by varying the phase position (in relation to the alternating supply voltage) of the ignition pulses to the thyristors. The thyristors can be ignited in principle at any time during each half-cycle.

If the ignition pulse is delivered at the beginning of the half-cycle (control angle $\alpha = 0$), the highest possible value of the direct voltage will be obtained. If the ignition pulse is delivered at the end of the half-cycle (control angle $\alpha = 180°$), the lowest value of the direct voltage will be obtained. If the inductance in the DC circuit and the average value of the direct current are of sufficient magnitude, the direct current will at each moment be greater than zero. The convertor will then work with continuous direct current.

In order to obtain a safe commutation under all circumstances during inverter operation ($\alpha > 90°$) when the direct current is continuous, the control angle must be limited, in a known manner, to a value which is less than 180°, for example 150° ($\alpha = \alpha_{max}$). This can be achieved by limiting the control signal, or by making certain that an ignition pulse is always delivered when $\alpha = \alpha_{max}$, regardless of whether an ignition pulse has previously been delivered or not. By taking this measure, also, the absolute value of the attainable negative direct voltage is limited to a value which is less than $\hat{U}_D$, (the highest possible value of a direct voltage $U_D$, which is reached when the control angle $\alpha$ is 0, which, however, does not cause any serious disadvantage in this mode of operation.

In the case of a purely resistive load the direct current will be discontinuous, that is it declines to zero for at least a short moment during each half-cycle.

In practice, the load object as a rule contains both resistive and inductive components and also a counter-electromotive force. In this case, when the direct current (its average value) is above a certain value, the current will be continuous. When the average current is below that value, the current will be discontinuous.

In order to secure the commutation in case of continuous direct current, it is necessary to limit the control angle, as mentioned above. This means that, with discontinuous direct current, it will not be possible to decrease the direct voltage $U_D$ to zero. This causes several serious drawbacks, for example the following in the case of motor drives:

a. If the motor is supplied with current from a single convertor, its speed cannot be reduced to zero at low load.

b. If the motor is supplied with current from a double convertor, unwanted pole reversals at a high frequency are obtained at zero speed, which may cause great stresses on the motor and the load.

c. In some cases, for example in case of inverter operation with a high counter-electromotive force, the direct current may become uncontrollable.

The disadvantages can be reduced, but not completely remedied, by increasing the inductance in the DC circuit, for example with the help of a reactor connected in series with the load object. However, such a reactor is heavy, space-demanding and expensive, and it reduces the control speed.

According to the invention, therefore, there is provided in this type of controlled static convertor a control pulse device which includes means for affecting the control angle of the rectifiers and means for limiting the control angle to an upper limit value. Means are provided responsive to a discontinuous direct current to render the control angle limiting means inactive, and also means are provided for sensing the direct current of the convertor and, if the direct current at a time corresponding to the upper limiting value of the control angle is less than a predetermined limiting value, to render the control angle limiting means inactive.

SUMMARY OF THE INVENTION

The invention relates to a convertor in which the above-mentioned disadvantages are eliminated in a simple and favorable manner. The invention is characterised in that the convertor comprises means arranged, in the case of discontinuous direct current, to make the means for limiting the control angle inactive.

BRIEF DESCRIPTION OF THE DRAWINGS

The invention will be described in more detail below with reference to the accompanying FIGS. 1–4, in which.

DESCRIPTION OF THE PREFERRED EMBODIMENTS

Figure 1:
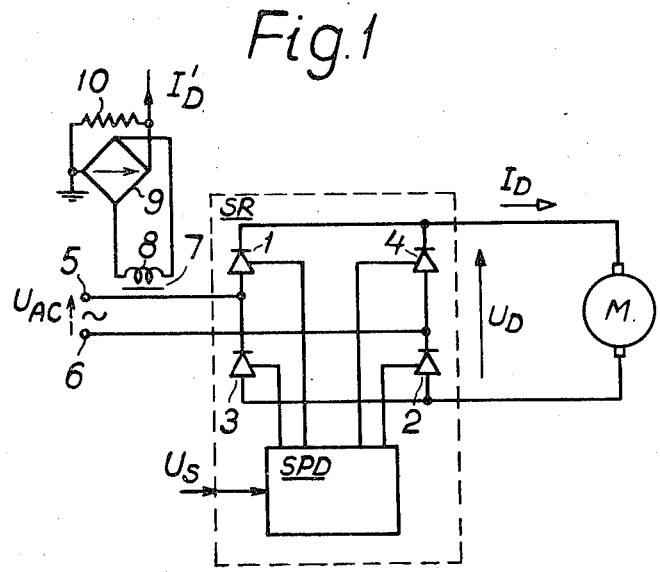
FIG. 1 shows a convertor connection, known per se, FIG. 2 control curves for the convertor in FIG. 1, FIG. 3 an example of the design of the control pulse device in a convertor according to the invention, and FIG. 4 the shapes of the curves of some of the signals occurring in the control pulse device.

In FIG. 1, a current transformer 7 is arranged in one AC lead to the convertor. The secondary winding 8 of the transformer is connected to the rectifier bridge 9, the negative DC output of which is set to zero. A direct voltage $I'_D$ will then be obtained across the resistor 10, said direct voltage at each moment being proportional to the direct current $I_D$.

Figure 2:
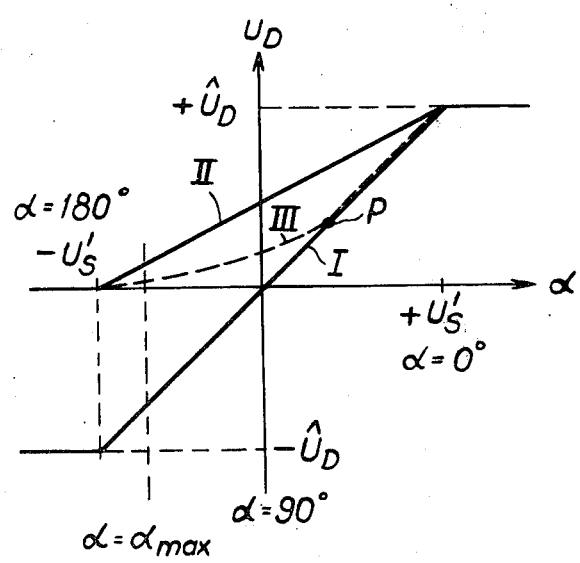

FIG. 1 shows a single-phase controlled static convertor SR, known per se, It has four thyristors 1, 2, 3 and 4, which receive ignition pulses from a control pulse device SPD. The AC terminals 5 and 6 of the convertor are connected to an alternating voltage source with the voltage $U_{AC}$. The DC side of the convertor is connected to a load object, shown in the form of a DC motor M. The direct voltage of the convertor is designated $U_D$ and the direct current $I_D$. The direct voltage of the convertor is controlled by phase-angle control, that is by varying the phase position (in relation to the alternating supply voltage) of the ignition pulses to the thyristors of the convertor. The thyristors 1 and 2 can be ignited in principle at any time during the half-cycle when $U_{AC}$ is positive. If an ignition pulse is delivered at the beginning of the half-cycle (control angle $\alpha = 0$), the highest possible value of the direct voltage $U_D$ will be obtained. If an ignition pulse is delivered at the end of the half-cycle (control angle $\alpha = 180°$), the lowest value of $U_D$ will be obtained. If the reactance in the DC circuit and the average value of the direct current $I_D$ are of sufficient magnitudes, the direct current $I_D$ will at each moment be greater than zero. The convertor will then work with continuous direct current. The curve I in FIG. 2 shows the control curve obtained in this case. FIG. 2 shows the direct voltage $U_D$ as a function of a control voltage $U_S$ supplied to the control pulse device SPD. The control curve I is a stratight line. At $U_S = +U'_S$ the control angle $\alpha = 0°$ and the direct voltage $U_D$ has its highest value $+\hat{U}_D$. At $U_S = -U'_S$, $\alpha = 180°$ and $U_D = -\hat{U}_D$.

Another operating case is obtained in case of a purely resistive load. In that case the control curve II in FIG. 2 applies, that is the direct voltage $U_D$ increases linearly from 0 to $\hat{U}_D$ when $U_S$ goes from $-U'_S$ ($\alpha = 180°$) to $+U'_S$ ($\alpha = 0°$). The direct current $I_D$ will then be discontinuous, that is it declines to zero for at least a short moment during each half-cycle.

In practice the load object as a rule contains both resistive and inductive components, and often also (as in motor drives) a counter-electromotive force. In the case of high direct current, the direct current will then be continuous and in the case of low direct current the direct current will be discontinuous. In the case of continuous direct current, the control curve follows the continuous curve I in FIG. 2. In the case of discontinuous direct current, on the other hand, the control curve follows the dashed-line curve III. This curve follows the curve I from the point $U'_S, +U_D$ to the point P, the position of which depends on the conditions in and the properties of the DC circuit. The curve then bends towards the point $U'_S$, O.

Figure 3:
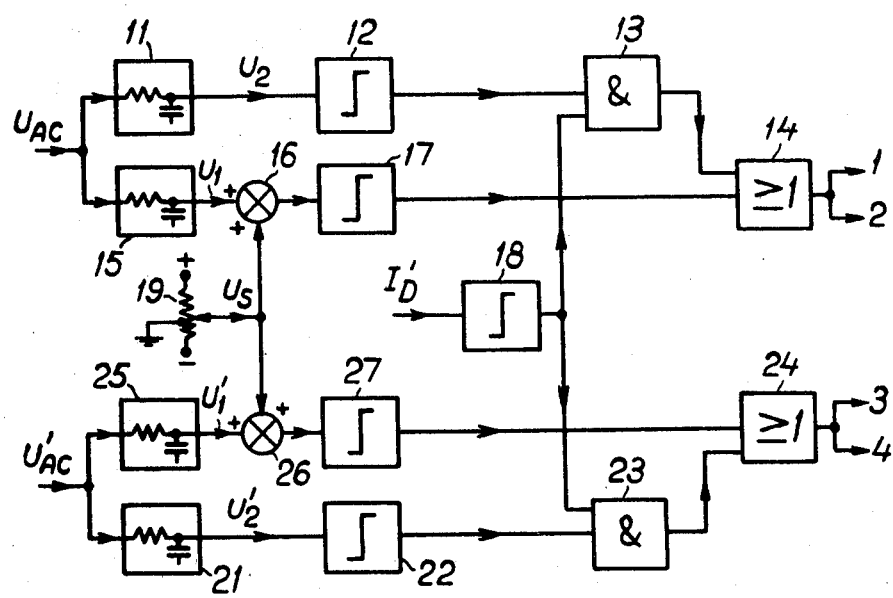

FIG. 3 shows how the control pulse device SPD can be designed in a convertor according to the invention.

The device SPD has two portions. One portion (elements 11 – 17) delivers control pulses to the thyristors 1 and 2 in FIG. 1. The other portion (elements 21–27) delivers control pulses to the thyristors 3 and 4.

Figure 4:
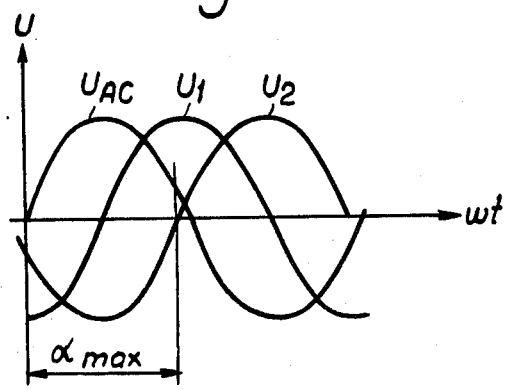

A voltage $U_{AC}$ (see FIG. 4), which is in phase with the line voltage, is supplied to two (symbolically shown) phase shift circuits 11 and 15. The circuit 15 delivers a voltage $U_1$ (see FIG. 4) which lags 90° in relation to $U_{AC}$. The voltage $U_1$ is added in the member 16 to a control voltage $U_S$. This is a direct voltage which can be set between a positive and negative maximum value by means of the potentiometer 19. When the sum $U_1 + U_S$ becomes greater than zero, the output signal of the flip-flop 17 switches from 0 to 1. The output signal of the OR circuit 14 then changes from 0 to 1 and is supplied, suitably by way of pulse-shaping and amplifying members, to the control electrodes of the thyristors 1 and 2. By varying $U_S$ the control angle $\alpha$ can be varied between 0° and 180°.

The phase shift circuit 11 delivers an output signal $U_2$ (see FIG. 4) which lags an angle $\alpha_{max}$ in relation to $U_{AC}$. The angle $\alpha_{max}$ is the maximum allowable control angle in case of continuous current. When $U_2$ becomes greater than zero the output signal of the flip-flop 12 switches from 0 to 1.

From the rectifier 9 in FIG. 1 the signal $I'_D$ is obtained which at each moment corresponds to the direct current $I_D$. This signal is supplied to the flip-flop 18. If a direct current flows, that is $I_D > 0$, the output signal of the flip-flop is 1. The output signal from the flip-flops 12 and 18 are supplied to the AND circuit 13. If the convertor is working with continuous direct current $I'_D > 0$ and the output signal from the flip-flop 18 is 1. When $\alpha = \alpha_{max}$ the output signal of the flip-flop 12 will become 1, the output signal of the AND circuit 13 switches to 1 and by way of the OR circuit 14 an ignition signal is delivered to the thyristors 1 and 2, which is necessary for the commutation to have time to take place before the zero passage of the alternating voltage.

However, if the convertor is working with discontinuous direct current and the instantaneous value of the direct current $I_D$ has dropped to zero already when $\alpha = \alpha_{max}$, the output signal from the flip-flop 18 is zero when $\alpha = \alpha_{max}$, and an ignition signal is therefore not delivered at this moment from the circuit 13. It will then be possible with the help of $U_S$ to increase $\alpha$ up to 180°, that is the direct voltage $U_D$ can be controlled as far down as the value zero.

The second half of the control pulse device (elements 21–27) is built up in exactly the same way as the half described above. It is supplied with an alternating voltage $U'_{AC}$ which is offset in phase 180° in relation to the line voltage $U_{AC}$. The control pulses to the thyristors 3 and 4 will thus be delivered with the same control angle and in dependence on the same conditions as the control pulses to the thyristors 1 and 2, but they will be offset in phase 180° in relation to the last-mentioned control pulses.

The control pulse device described above is only one example. The circuit (15,16,17) for setting the control angle in dependence on a control signal, as well as the circuit (11,12) for limiting the control angle to $\alpha_{max}$ may be constructed in a great many alternative ways.

Similarly, the invention can be applied to convertors with other connections of the main circuit than the one shown in FIG. 1. For example, the thyristors 2 and 3 in FIG. 2 can be replaced with diodes.

The current measuring device (7, 8, 9, 10) in FIG. 1 can also be constructed in a number of alternative ways. For example, the direct current can be measured directly in the DC circuit with the aid of a measuring transductor, a measuring shunt or a Hall generator.

The upper limit value $\alpha_{max}$ of the control angle does not have to be fixed, but may be arranged, for example, to be automatically affected by the magnitude of the load current or by the amplitude of the supply alternating voltage.

The flip-flop 18 in FIG. 3 is arranged to emit the output signal 1 when $I'_D > 0$. In practice it may be suitable to construct the flip-flop in such a way that the output signal will be 1 when $I'_D > \Delta$ and 0 when $I'_D < \Delta$, $\Delta$ being a small positive quantity.

I claim:

1. Controlled static convertor having terminals (5,6) for connection to an alternating voltage source, comprising controlled rectifiers (1, 2, 3, 4) and a control pulse device (SPD) arranged to deliver control signals to the rectifiers, the control pulse device comprising means (15, 16, 17; 25, 26, 27; 19) for affecting the control angle ($\alpha$) of the rectifiers and means (11, 12; 21, 22) for limiting the control angle to an upper limit value ($\alpha_{max}$), the convertor comprising means (7, 8, 9, 10, 13, 18) responsive to a discontinuous direct current to render the control angle limiting means inactive.

2. Controlled convertor according to claim 1, which comprises current-sensing means (7, 8, 9, 10, 13, 18) for sensing the direct current ($I_D$) of the convertor and means, if the direct current at a time corresponding to said upper limit value ($\alpha_{max}$) of the control angle ($\alpha$) is less than a predetermined limit value, to render the means for limiting the control angle inactive.

* * * * *